United States Patent [19]
Opitz et al.

[11] 4,145,182
[45] Mar. 20, 1979

[54] PROCESS FOR THE PREPARATION OF DISPERSE DYES HAVING GOOD PRINTING PROPERTIES FOR TRANSFER PRINTING

[75] Inventors: Konrad Opitz, Liederbach, Taunus; Christa Uhde, Kelkheim, Taunus, both of Fed. Rep. of Germany

[73] Assignee: Hoechst Aktiengesellschaft, Frankfurt am Main, Fed. Rep. of Germany

[21] Appl. No.: 874,613

[22] Filed: Feb. 2, 1978

Related U.S. Application Data

[63] Continuation of Ser. No. 551,234, Feb. 20, 1975.

[30] Foreign Application Priority Data

Feb. 23, 1974 [DE] Fed. Rep. of Germany ....... 2408899

[51] Int. Cl.$^2$ .......................... C09B 1/00; C09B 5/62
[52] U.S. Cl. ...................................... 8/39 R; 8/2.5 A; 8/76; 8/85 B; 8/89 A; 8/92; 8/93; 106/22; 260/378; 260/381
[58] Field of Search ................. 8/39, 2.5 A, 39 R, 76, 8/94 R, 94 A, 85 B, 89 A, 92, 93; 106/22

[56] References Cited

U.S. PATENT DOCUMENTS 3,958,929  5/1976  Hornle et al. .............................. 8/79

FOREIGN PATENT DOCUMENTS 1029506  5/1958  Fed. Rep. of Germany.
1184318  8/1962  Fed. Rep. of Germany.
1619535  5/1971  Fed. Rep. of Germany.
 973851 10/1964  United Kingdom.
1221126  2/1971  United Kingdom.
 292698 10/1971  U.S.S.R.

Primary Examiner—A. Lionel Clingman
Attorney, Agent, or Firm—Curtis, Morris & Safford

[57] ABSTRACT

Disperse dyestuffs which are sufficiently capable of subliming for serving in the transfer print process but which yield printing inks of a too high viscosity can be finished to fit the requirements for printing inks for transfer printing by treating said dyestuffs in a liquid medium at a temperature between 50° and 180° C. Thus printing inks of sufficiently low and constant viscosity can be obtained.

10 Claims, No Drawings

PROCESS FOR THE PREPARATION OF DISPERSE DYES HAVING GOOD PRINTING PROPERTIES FOR TRANSFER PRINTING

This is a continuation of application Ser. No. 551,234, filed Feb. 20, 1975.

The present invention relates to a process for the preparation of disperse dyes having good printing properties for transfer printing.

In heat transfer or thermoprinting, disperse dyes having sufficient sublimation capability are worked to printing pastes using binders and organic solvents, the so-called varnishes, or water and are printed on suitable paper according to known printing processes, such as gravure printing, offset printing or flexographic printing.

The predominant process is gravure printing in which anhydrous printing inks are used. Under the action of heat, the disperse dyestuff is transferred from the paper to the polyester fabric or to a fabric made of other synthetic fibers. The disperse dyestuff can also be transferred from paper to blended fabrics, for example, polyester-cotton blend, provided that the portion of synthetic fiber in the blend is high enough.

For the preparation of printing inks, there may be used pulverulent, pure disperse dyes or disperse dyes mixed with suitable diluents, for example natural or synthetic resins or cellulose derivatives. In this case, it is not necessary that the disperse dyestuff is as finely divided as it is required for its usual fields of application where the fine division required is only achieved by sand or pearl grinding in the presence of dispersing agents. The fine division necessary for the use in printing inks for heat transfer printing is achieved, for example, by grinding a dried, pure disperse dyestuff in a pin mill. The mixing agent to be added can either be ground at the same time in the pin mill or mixed after grinding with the ground disperse dyestuff in the desired ratio. The grain sizes achieved in the pin mill are in general, about 10 to 100 times larger than those achieved by pearl grinding. A similar degree of fine division is achieved by treating an aqueous suspension of a disperse dyestuff, optionally in the presence of the desired diluent, with a dissolver, a turbulent mixer or homogenizers having a similar effect or also with a ball mill. Very suitable preparations are also obtained by treating a mixture of dyestuff and diluent in a kneader.

However, practice shows, that some disperse dyestuffs assumed to be suitable for heat transfer printing on account of their relatively poor fastness to sublimation, cannot be used because the anhydrous gravure printing inks prepared with these dyestuffs are not sufficiently stable in their viscosity and more or less rapidly after-thicken until they become unusable, or they are, a priori, in the form of a paste uncapable of flowing which can, therefore, not be processed. This undesired property of some of the disperse dyestuffs suppposedly suitable for transfer printing, cannot be overcome even by modifying the binder or varnish preparations. However, in gravure printing mainly carried out in practice, a printing ink of good flowability is absolutely necessary. Moreover, such a printing ink should retain its flowability over a longer period of time, at least for 4 weeks, for only under these conditions rational working is possible.

The present invention provides a process for the preparation of disperse dyestuffs which yield printing inks of suitable and constant viscosity for printing transfer printing paper according to the gravure printing process, which process comprises treating such disperse dyestuffs — which when obtained according to usual processes yield printing inks having viscosity properties unsuitable for gravure printing — in an aqueous, water containing or water-free medium at a temperature within the range of from 50° to 180° C., preferably from 80° to 130° C., optionally while stirring.

The process of the invention can be carried out using an already isolated, purified and, optionally, dried disperse dyestuff which was prepared according to the usual methods. Another possible method is to use directly an aqueous, water-containing or water-free suspension formed in the usual preparation method, the addition of one or several organic solvents being a possible advantage. Suitable organic solvents are those in which the dyestuff shows a solubility as low as possible. Preferably, hydrocarbons are used, especially aliphatic hydrocarbons, but also cycloaliphatic or aromatic hydrocarbons which may be halogenated completely or partially, such as petroleum ether boiling within the range of from 50° to about 200° C., tetrachloromethane, perchloroethylene, chlorobenzene, dichlorobenzenes, toluene and xylene. Furthermore, solvents miscible with water are used, preferably in mixture with water, such as dimethyl formamide, alkanols of up to 6 carbon atoms, lower dialkyl ketones, such as acetone, dimethyl sulfoxide and lower alkane carboxylic acids, such as acetic acid. The period of the treatment according to the invention at a temperature within the range of from 50° C. to 180° C. depends on the nature of the disperse dyestuff, however, at the temperatures preferably applied, the period required is within the range of 30 minutes to 10 hours. The pH-value of the aqueous medium may vary within wide limits, but it is, preferably to be held within the range of 5 to 8, so that sensitive substituents optionally present in the disperse dyestuffs remain unchanged.

In the process according to the invention for the preparation of disperse dyestuffs which yield printing inks of suitable and constant viscosity for the printing of transfer printing paper according to the gravure printing process, the crystal modification can be changed, for example, as described in German Offenlegungsschrift No. 1,619,535, which is, however, no prerequisite for the disperse dyestuffs treated according to the invention to yield gravure printing inks of suitable and constant viscosity.

The viscosity of the printing inks described in the following Examples is characterized by the "flow time" measured according to DIN (German Industrial Standard) 53,211 which they need to run out of a DIN beaker ("Ford cup") provided with a nozzle of 4 mm diameter. In the case of the anhydrous printing inks obtainable according to the invention this time is less than 35 seconds, preferably 25 seconds or less.

The binders used in the Examples for the preparation of the printing inks have the following composition:

Binder A:
  12% of ethyl cellulose N 7
  3% of ethyl cellulose N 22
  10% of ethylene glycol monoethyl ether
  25% of ethyl acetate
  50% of ethanol Binder B:
  12% of ethyl cellulose N 7
  3% of ethyl cellulose N 22

10% of ethylene glycol monoethyl ether
75% of ethanol.

"Ethyl cellulose N 7" and "N 22" are cellulose ethyl ethers and commerical products of Messrs. Hercules Inc., Wilmington, Dela. 19899/USA. The numbers indicate the average viscosity of a 5% solution in a 4 : 1 mixture of toluene and ethanol at 25° C. in cP.

The cellulose acetobutyrates used in the Examples are commerical products of Messrs. Eastman Kodak Co., Kingsport, Tenn. 37662/USA and are distinguished as follows:

Cellulose acetobutyrate CAB 551-0.2:
  acetyl content: 2.0%
  butyryl content: 53%
Cellulose acetobutyrate CAB 381-2:
  acetyl content: 13.5%
  butyryl content: 37%

The process of the invention is preferably applied for dyestuffs of the general formula

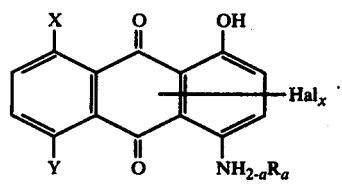

in which one of the radicals X and Y is a hydroxy group and the other one is a radical of the formula $-NH_{2-b}R'_b$, R and R' being-preferably identical - alkyl groups of 1 or 2 carbon atoms, preferably methyl groups, Hal stands for chlorine atoms or, preferably, bromine atoms, X is a number of 0 to 2, preferably 1, and a and b each is a number from 0 to 2, a + b giving 0 to 3, preferably 0.5 to 2, especially 0.5 to 1. Such dyestuffs are, for example, described in German Pat. Nos. 1,029,506, 1,150,477 and 1,162,961.

The dyestuffs referred to in the Examples are prepared as follows; the parts being by weight:

(1) (German Pat. No. 1,162,961, Example 2)

27 Parts of 4,8-diamino-1,5-dihydroxyanthraquinone were dissolved at 40° C. in 100 parts of 100% sulfuric acid ("monohydrate"), 10 parts of polyphosphoric acid were added and then, 3 parts of para-formaldehyde were introduced at 30° C. while stirring. The mixture was stirred for 8 hours at 30°-35° C. and the reaction mixture was carefully poured onto ice. The dyestuff obtained was suction-filtered and washed until neutral.

(2) (German Pat. No. 1,150,477, Example 1)

14 Parts of 4,8-diamino-1,5-dihydroxyanthraquinone were dissolved at 40° C. in 68 parts of 100% sulfuric acid, the solution was allowed to cool and 1.5 parts of paraformaldehyde were introduced portionwise while stirring so that the temperature did not exceed 35° C. Then, the mixture was stirred for 4 to 10 hours at 30° to 35° C. and carefully poured onto ice. The precipitate was suction-filtered and washed until neutral. After drying, 14.5 parts of a blue dyestuff were obtained.

(3) (German Pat. No. 1,029,506, Example 2)

27 Parts of 4,8-diamino-1,5-dihydroxyanthraquinone and 10 parts of boric acid were dissolved in 250 parts of 97.9-99.0% sulfuric acid to which solution 0.1 part of iodine and 10 parts of bromine were added. Then, the solution was stirred at 50° C. until the bromine has been consumed, then the reaction mixture was poured onto ice, the precipitate was suction-filtered and washed until neutral. So, 35 parts of a blue dyestuff were obtained which contained about 25% of bromine.

(4) (German Pat. No. 1,162,961, Example 1)

27 Parts of a mixture of 55 parts of 4,8-diamino-1,5-dihydroxy-anthraquinone and 45 parts of 4,5-diamino-1,8-dihydroxyanthraquinone were dissolved at 40° C. in 100 parts of 100% sulfuric acid, the mixture was allowed to cool and into the solution obtained a previously prepared mixture of 100 parts of 100% sulfuric acid, 3 parts of paraformaldehyde, 5 parts of phosphorous pentoxide, and 20 parts of N-methylacetamide was added dropwise at 30° to 35° C. while stirring. Then, the solution was again stirred at that temperature for 4 to 10 hours and the reaction mixture was carefully put onto ice. The precipitate obtained was suction-filtered and washed until neutral.

EXAMPLES

EXAMPLE 1

10 Parts of the disperse dyestuff (1) in the form of 30 parts of the filter cake, which has been washed until neutral were suspended in 80 parts of water and heated to 130° C. for 1 hour in the stirring autoclave. After cooling, 17.3 parts of cellulose acetobutyrate CAB 551-0.2 and 1.3 parts of cellulose acetobutyrate CAB 381-2 were added to the dyestuff suspension and passed twice through a colloid mill. Suction-filtering and drying in the vacuum drying cabinet at 60° C. followed. The dry filter cake disintegrated to loose granules, 5 parts of which were worked into 95 parts of binder A in an attritor. Immediately after its preparation, this printing ink showed a flow time of 18 seconds and was excellently suitable for printing heat transfer printing papers according to the gravure printing process. After a 7 days' storage at 50° C., which approximately corresponds to a storage of 4 weeks at room temperature, the flow time of the printing ink was 19 seconds.

However, when the printing ink was prepared from a preparation having the same composition and being prepared in the same manner, but which contained the disperse dye (1) not being after-treated in the autoclave, the flow time of the printing ink was 25 seconds immediately after the preparation of the printing ink. After a 7 days' storage at 50° C. the printing ink had completely thickened, could not flow any longer and had become unusable.

EXAMPLE 2

10 Parts of dry dyestuff (2) were heated in 100 parts of perchloroethylene to 100° C. for 2 hours while stirring. Then, the perchloroethylene was eliminated by steam distillation, the dyestuff was suction-filtered from the aqueous suspension obtained and dried at 60° C. in vacuo. This dyestuff was ground in a pin mill. 1.75 parts of the pulverulent dyestuff were processed with 98.25 parts of binder A in an attritor to yield a printing ink which showed a flow time of 24 seconds and excellently suits for printing heat transfer paper according to the gravure printing process. After a storage time of 7 days at 50° C., the viscosity of the printing ink remained unchanged.

However, when 1.75 parts of dyestuff (2) not being treated with perchloroethylene were used for the preparation of the printing ink the resulting printing ink showed a flow time of 26 seconds. After a 7 days' storage at 50° C., the printing ink had completely thickened. The viscosity could not be determined any longer.

EXAMPLE 3

10 Parts of disperse dyestuff (2) were introduced in the form of the dried filter cake in a mixture of 90 parts of water and 10 parts of dimethyl formamide and heated to 100° C. for 4 hours. Then, the dyestuff was suction-filtered, washed and dried at 60° C. in vacuo. 7.5 parts of this dyestuff were ground with 16.4 parts of cellulose acetobutyrate CAB 551-0.2 and 1.1 parts of cellulose acetobutyrate CAB 381-2 in a pin mill. After incorporating 5 parts of this preparation into 95 parts of binder B by means of a usual dispersing aggregate, the printing ink showed a flow time of 25 seconds and suited very well for printing heat transfer paper according to the gravure printing process. After a storage time of 7 days at 50° C., the viscosity remained unchanged. Also in the following storage for 6 weeks at room temperature, the viscosity of this printing ink did not change.

However, when the printing ink was prepared by means of a preparation having the same composition with the difference of containing a dyestuff (2) which had not been after-treated with water-containing dimethyl formamide, the flow time was 45 seconds. Already after 24 hours, this printing ink had thickened to be completely unusable and the viscosity could not be determined any longer.

EXAMPLE 4

10 Parts of dyestuff (3) in the form of 35 parts of the filter cake washed until neutral were heated in 75 parts of water in the autoclave to 130° C. for 3 hours while stirring. After cooling, the dyestuff was suction-filtered, dried at 60° C. in vacuo and pulverized in a pin mill. Using 1.75 parts of this dyestuff powder and 98.25 parts of binder B, a printing ink was obtained in the attritor having a flow time of 17 seconds which excellently suited for printing heat transfer printing paper according to the gravure printing process. After a storage period of 7 days at 50° C. the printing ink had a flow time of 24 seconds.

However, when the printing ink was prepared using the dyestuff (3) which had not been treated in the autoclave, dried and ground in the pin mill, the printing ink thickened so much already during its preparation in the attritor that it could not be used at all. The viscosity could not be measured.

EXAMPLE 5

10 Parts of the disperse dyestuff (4) in the form of the filter cake washed neutral and dried were heated to 110° C. during 2 hours in 100 parts of chlorobenzene, while stirring. Then, the chlorobenzene was eliminated by steam distillation. 18.6 parts of rosin (colophony) were added to the aqueous dyestuff suspension, the whole being passed through a colloid mill.

After suction-filtering and drying at 60° C. in vacuo, a preparation in the form of loose granules was obtained. 5 parts of this preparation yielded, upon being worked into 95 parts of binder A, a printing ink of a flow time of 28 seconds which suited very much for printing heat transfer printing paper according to the gravure printing process. After a 7 days' storage at 50° C., the flow time was 32 seconds.

However, when the printing ink was prepared using a preparation of the same composition, with the difference that it contained dyestuff (4) which had not been treated with chlorobenzene, the flow time was 41 seconds. After a storage period of 7 days at 50° C., that printing ink had thickened and could no longer be used for printing. Its viscosity could no longer be determined.

EXAMPLE 6

10 Parts of dyestuff (3) in the form of 40 parts of filter cake were heated to 130° C. for 1 hour in 70 parts of water in the autoclave, while stirring. After cooling, there were added to the aqueous dyestuff suspension 17.3 parts of cellulose acetobutyrate CAB 551-0.2 and 1.3 parts of cellulose acetobutyrate CAB 381-2 and the whole was ground in a colloid mill. After suction-filtering, the filter cake was dried at 60° C. in vacuo. 5 parts of this dyestuff preparation were incorporated into 95 parts of binder A by means of an attritor.

The flow time of the printing ink was 13 seconds. After a storage period of 7 days at 50° C., the flow time had not changed and the printing ink still suited excellently for printing heat transfer printing paper according to the gravure printing process.

Even when the storage period was extended to several weeks at room temperature, the viscosity did not increase.

When in the preparation of the printing ink a preparation was used which had the same composition with the difference, however, that it contained dyestuff (3) which had not been treated in the autoclave, the flow time of the printing ink immediately after preparation was 20 seconds, increasing to 38 seconds after a storage of 7 days at 50° C. The viscosity increased during subsequent storage at room temperature reaching after a 7 days' storage at 50° C. and a 2 weeks' storage at room temperature a degree of viscosity that could not be determined any longer and the printing ink was spoilt for use in printing.

We claim:

1. A process for finishing disperse dyestuffs of the formula

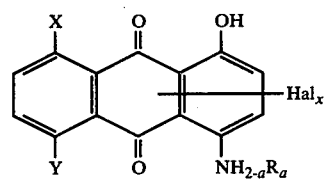

wherein one of the substituents X and Y is hydroxy and the other is $-NH_{2-b}R'_{b'}$, R and R' are the same or different groups selected from methyl and ethyl, a and b are numbers from zero to 2, the sum of which is zero to 3, Hal is chlorine or bromine and x is a number from zero to 2, said dyestuff being one which is sufficiently capable of subliming so as to be used in a transfer print process, said finishing process being for the purpose of improving the performance of the dyestuff in a printing ink of constant viscosity used in an anhydrous process for printing transfer printing paper, which finishing process comprises treating said dyestuff at a temperature of 80° to 130° C. in a liquid medium consisting of water.

2. A process for finishing disperse dyestuffs of the formula

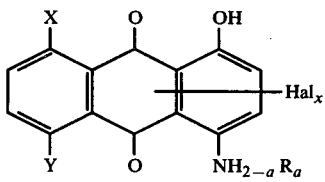

wherein one of the substituents X and Y is hydroxy and the other is —NH$_{2-b}$R'$_{b'}$, R and R' are of the same or different groups selected from methyl and ethyl, a and b are numbers from zero to 2, the sum of which is zero to 3, Hal is chlorine or bromine and x is a number from zero to 2, said dyestuff being one which is sufficiently capable of subliming so as to be used in a transfer print process, said finishing process being for the purpose of improving the performance of the dyestuff in a printing ink of constant viscosity used in an anhydrous process for printing transfer printing paper, which finishing process comprises treating said dyestuff at a temperature of 80° to 130° C. in a liquid medium consisting of an aliphatic hydrocarbon boiling between 50° and 200° C., a chlorinated aliphatic hydrocarbon of 1 to 4 carbon atoms, toluene, xylene, chlorobenzene, dichlorobenzene or a mixture thereof.

3. A process for finishing disperse dyestuffs of the formula

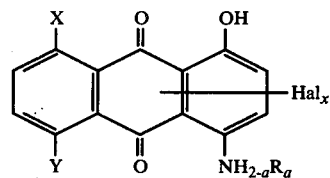

wherein one of the substituents X and Y is hydroxy and the other is —NH$_{2-b}$R'$_{b'}$, R and R' are the same or different groups selected from methyl and ethyl, a and b are numbers from zero to 2, the sum of which is zero to 3, Hal is chlorine or bromine and x is a number from zero to 2, said dyestuff being one which is sufficiently capable of subliming so as to be used in a transfer print process, said finishing process being for the purpose of improving the performance of the dyestuff in a printing ink of constant viscosity used in an anhydrous process for printing transfer printing paper, which finishing process comprises treating said dyestuff at a temperature of 80° to 130° C. in a liquid medium consisting of dimethyl formamide, an alkanol of 1 to 6 carbon atoms, acetone, dimethylsulfoxide, an alkanoic acid of 1 to 4 carbon atoms or a mixture thereof or a mixture of one or more of said solvents with water.

4. A process as defined in claim 3, wherein the liquid medium is a water containing organic water-miscible solvent.

5. A process as defined in claim 3, wherein the dyestuff is stirred in the liquid medium.

6. A process as defined in claim 3, wherein R and R' are methyl.

7. A process as defined in claim 3, wherein the sum of a and b is 0.5 to 2.

8. A process as defined in claim 3, wherein the sum of a and b is 0.5 to 1.

9. A process as defined in claim 3, wherein Hal is bromine.

10. A process as defined in claim 3, wherein x is 1.

* * * * *